Figure 2:
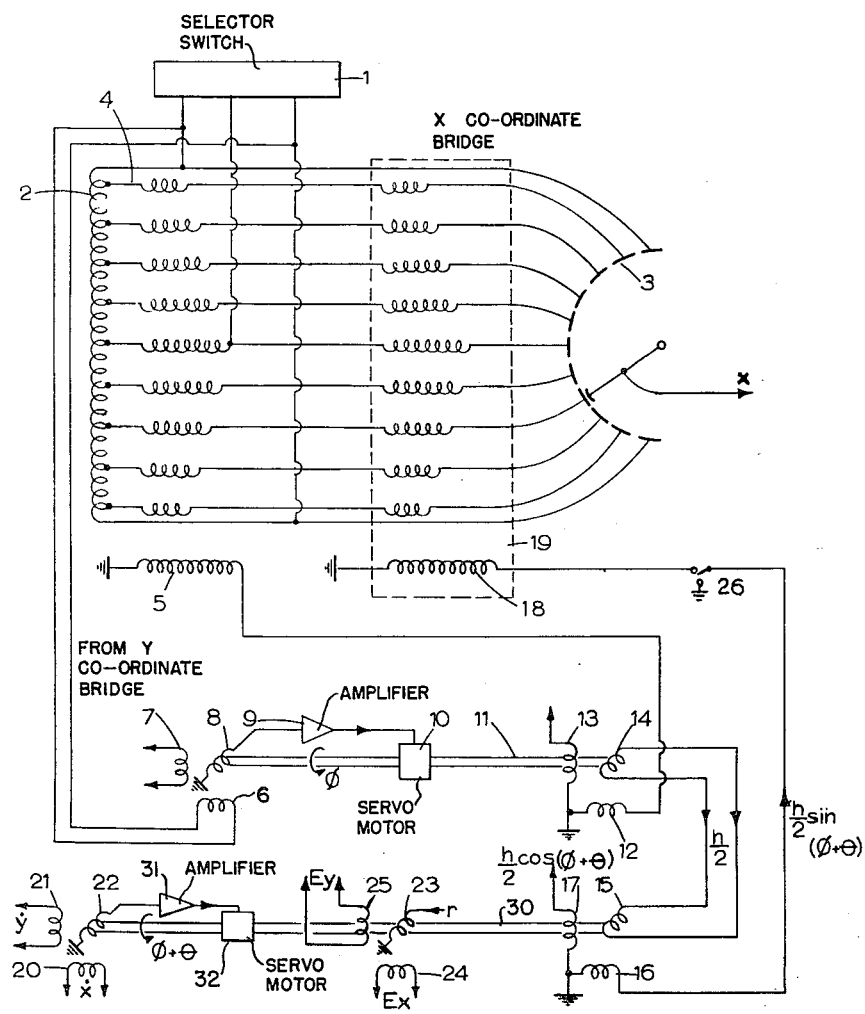

Feb. 13, 1962 R. E. SPENCER 3,021,075
INTERPOLATING DEVICES, ESPECIALLY FOR CONTROLLING
AUTOMATIC MACHINE TOOLS
Filed July 9, 1957 3 Sheets-Sheet 1
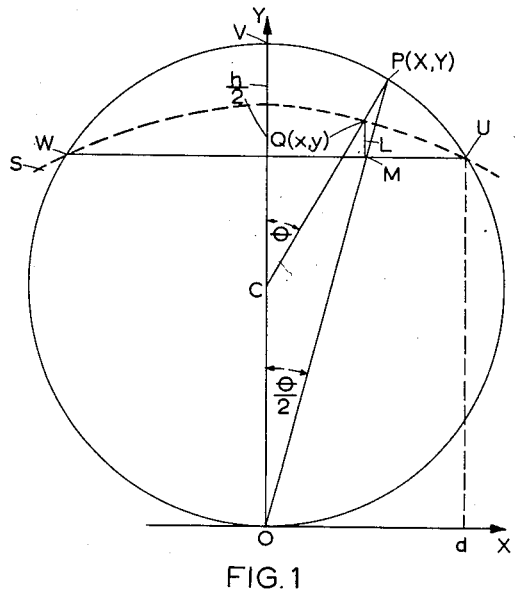
FIG. 1
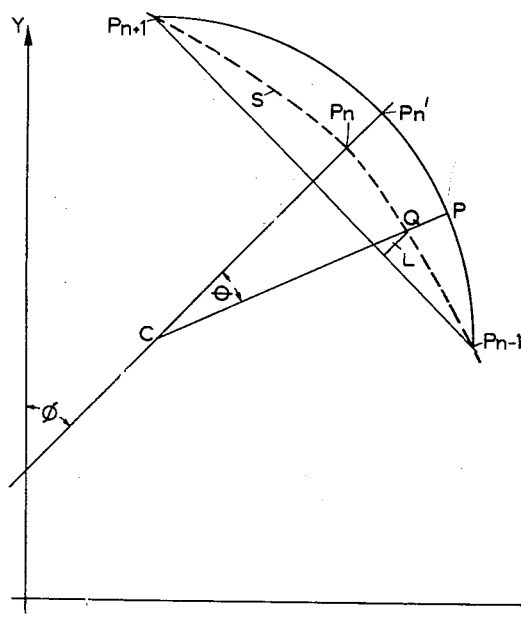
FIG. 3
Inventor
R. E. Spencer United States Patent Office 3,021,075
Patented Feb. 13, 1962

3,021,075
INTERPOLATING DEVICES, ESPECIALLY FOR CONTROLLING AUTOMATIC MACHINE TOOLS
Rolf Edmund Spencer, London, England, assignor to Electric & Musical Industries Limited, Hayes, Middlesex, England, a company of Great Britain
Filed July 9, 1957, Ser. No. 670,738
Claims priority, application Great Britain July 10, 1956
7 Claims. (Cl. 235—197)

This invention relates to interpolating devices, especially, though not exclusively, for controlling automatic machine tools.

Various proposals have been made by the inventor with regard to such above-mentioned devices which devices are arranged to derive signal representations of points intermediate to a sequence of signal representations of reference points forming the inputs to an interpolator. The signals representative of the reference points and intermediate points form the output from such an interpolator and these signals may be utilised for controlling component parts of automatic machine tools so as to move in a predetermined and continuous manner with respect to each other.

It may be required of two component parts of an automatic machine tool, for example a workpiece holder and a cutting tool holder, that they move so that the motion of one, the tool holder say, with respect to the other conforms to any desired contour, which may include circular arcs. Circular arcs may be approximated to by a parabolic arc to an acceptable degree of accuracy for automatic machine tool purposes, but only if the span of the arc subtends a sufficiently small angle at its centre, thus severely limiting the span of an arc so generated.

The object of the present invention is to facilitate the generation of arbitrary contours which include circular arcs in response to signal representation of reference points by one component, such as the aforementioned cutter, with respect to another component of an automatic machine tool.

According to the present invention there is provided an interpolating device comprising three input terminals, a plurality of output terminals, an auto-transformer connected from a first of said input terminals to a third of said terminals, a second transformer having a first winding connected from the second of said input terminals to a tap on said auto-transformer and having a plurality of lift windings respectively connected at one end to a plurality of taps on said auto-transformer, said taps corresponding respectively to said output terminals, said second transformer having a quadratic law predetermined to produce in said lift windings voltages representing the lifts of a parabolic arc defined by said applied signals above the chord of said arc at points corresponding to said output terminals, thereby to provide at the other ends of said lift windings a plurality of signals representing values of one co-ordinate of points on said parabolic arc, means responsive to the voltage across a winding of said second transformer for providing a plurality of additional signals, and means for adding said additional signals respectively to said signals representing values of one co-ordinate of points on said parabolic arc and for applying the resultant signals as output signals respectively to said output terminals, said means for providing said additional signals being predetermined to cause the output signals to represent values of one co-ordinate of points on a circular arc derived from said parabolic arc.

Preferably in said device said first means comprises two transformers intercoupling said input and output terminals, one of said transformers having a quadratic law and having secondary windings on which are produced voltages representing the lifts of the parabolic arc above its chord at points corresponding to said output terminals, and said further means being responsive to said transformer of quadratic law for modifying the signals which are or would otherwise be set up at said output terminals.

Figure 4:
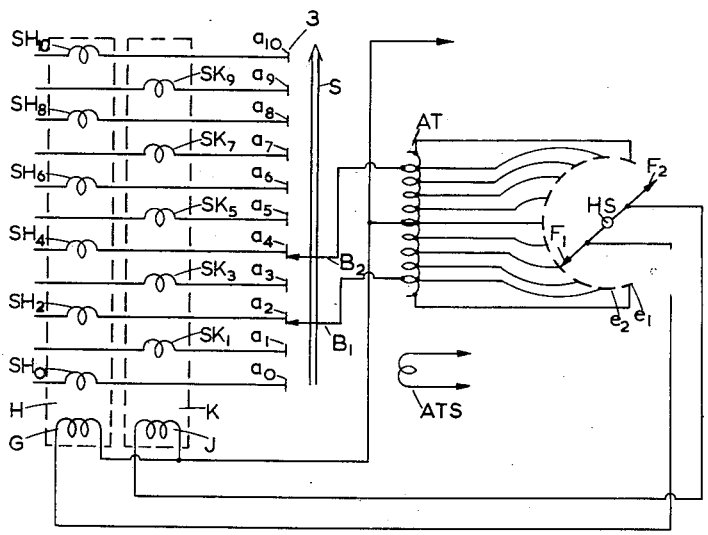
Figure 5:
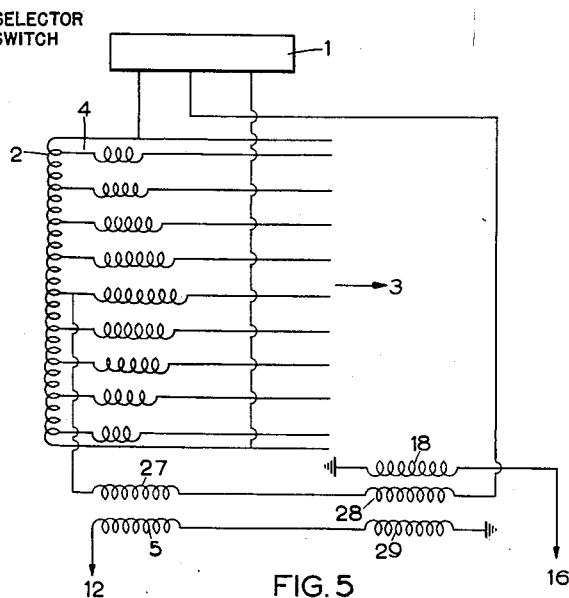

In order that the invention may be clearly understood and readily carried into effect, the invention will be described with reference to the accompanying drawings, in which:

FIGURE 1 illustrates in a particular case the relationship between a desired circular arc and a programmed parabolic arc, FIGURE 2 illustrates one example of the present invention, FIGURE 3 illustrates the arcs of FIGURE 1 in the general case, FIGURE 4 illustrates one form of sub-interpolation which may be employed by the present invention, and FIGURE 5 illustrates a further example of the present invention.

In the example of the present invention to be described with reference to FIGURE 2 a circular arc is generated when required from a primary parabola by the addition of a vector directed normally outwards from the circular arc and having a magnitude equal to the instantaneous lift of the parabola above the span, the components of which vector are derived from the parabola. The necessary justification of this embodiment of the invention can be readily understood with the aid of FIGURE 1 of the accompanying drawing, in which the required arc is UVW and is shown together with the remainder of the circle, centre C. For the arc UVW, the interpolating device is programmed as though to generate a parabolic arc of half the lift required to make contact with the required circular arc at V but in response to a suitable selecting signal, the device is programmed to generate the required circular arc. Let P (X,Y) be the point derived from the point Q (x,y) of the parabola S by the addition of a vector of magnitude $QM=L$ and direction CQ.

It can be shown that, $$L=\frac{h}{2}\left(1-\frac{x^2}{d^2}\right)$$

where $2d=UW$.

Also $$X=x+\frac{h}{2}\left(1-\frac{x^2}{d^2}\right)\sin\theta=x+h\left(1-\frac{x^2}{d^2}\right)\sin\frac{\theta}{2}\cos\frac{\theta}{2}$$

$$Y=(2R-h)+\frac{h}{2}\left(1-\frac{x^2}{d^2}\right)+\frac{h}{2}\left(1-\frac{x^2}{d^2}\right)\cos\theta$$

$$=(2R-h)+h\left(1-\frac{x^2}{d^2}\right)\cos^2\frac{\theta}{2}$$

Therefore $$\frac{X-x}{Y-(2R-h)}=\tan\theta/2$$

But $$\tan\frac{\theta}{2}=\frac{x}{2R-h}$$

Therefore $$\frac{X-x}{Y-(2R-h)}=\frac{x}{2R-h}=\frac{X}{Y}=\tan\theta/2$$

Thus, since $$X/Y=\tan\theta/2$$

the locus of P is the required circular arc.

Referring to FIGURE 2 the example of an interpolating device shown will be assumed to be part of a control mechanism for automatic milling machines such as described for example in the specification of co-pending United States application Serial No. 581,038, now Patent No. 2,929,555, wherein two signals are derived representative of the two co-ordinates of points on the required locus of the motion of the cutting tool holder of the milling machine with respect to the workpiece holder (although it may be the workpiece holder which moves relative to the cutting tool holder, as is considered in the aforementioned application).

The aforementioned control mechanism incorporates a quadratic interpolating device comprising two pairs of individual parabolic bridges, each pair generating a signal representative of one of the required co-ordinate signals. Signals representative of a particular co-ordinate or point will hereinafter be referred to as that co-ordinate or point. The two bridges forming a pair generate the appropriate co-ordinate signals alternately from three input signals under the control of a selector switch, this operation being described fully in the afore-mentioned application. FIGURE 2 illustrates a parabolic bridge such as used in the arrangements of the co-pending patent applications but modified according to the present invention. Three input signals representative of the $x$ co-ordinates $x_{n-1}$, $x_n$, $x_{n+1}$, of the reference points $P_{n-1}$, $P_n$, $P_{n+1}$, are applied via a selector switch 1 to the bridge which comprises auto-transformer 2 on which are eleven, say, regularly spaced points connected to the eleven studs or output terminals on one half of the stud circle 3, the other half of the stud circle 3 which is connected in similar manner to the other bridge of the pair not being shown. The connections from the points on the auto-transformer 2 to the stud circle 3 selectively include a series of transformer windings denoted in general by 4 which are inductively coupled to each other but not to the winding 2. The windings 4 are termed parabolic lift windings and have numbers of turns which are related to each other in accordance with a quadratic law as described in the specification of co-pending U.S. app. Serial No. 459,814, now Patent No. 2,928,604. There are produced across the lift windings voltages representing the lifts of the parabolic arc above its chord at points corresponding to the output terminals 3. The centre lift coil of the coils 4 is inductively coupled to a similar coil 5.

Referring to FIGURE 3 which illustrates in the general case the primary parabola $P_{n-1}$, $P_n$, $P_{n+1}$, of the required circular are $P_{n-1}$, $P_n$, $P_{n+1}$, the lift L of the parabola above the chord ($P_{n-1}$, $P_{n+1}$) is represented by the voltage across the lift coils of the parabolic bridge for nine regularly spaced points along the chord ($P_{n-1}$, $P_{n+1}$), the lifts at the end points being zero. The angle which the perpendicular bisector of the chord ($P_{n-1}$, $P_{n+1}$) makes with the $y$-axis is $\phi$ and this may be generated by solving the equation $(x_{n+1}-x_{n-1}) \sin \phi - (y_{n+1}-y_{n-1}) \cos \phi = 0$. This is done by a resolver comprising two stators 6 and 7, a rotor 8, amplifier 9, and servo-motor 10 controlling the axis 11 of the rotor 8. The input to the stator 6, say, is derived from the end inputs $x_{n-1}$ and $x_{n+1}$ of the auto-transformer 2, the input to the other stator 7 being similarly derived from the corresponding $y$-bridge, so that the servo-motor 10 operates to maintain the rotor 8 at an angle $\phi$ to the stator 7.

A further resolver, arranged similarly to the aforementioned resolver, comprises stators 12 and 13, and a rotor 14 parallel to the rotor 8 and on the same axis 11 so as to be at angle $\phi$ with the stator 13. The stator 12 is fed from the coil 5 with the $x$-component of the lift $h/2$ at the centre of the parabolic arc and the stator 13 is fed with the $y$-component of this lift from a similar coil operating in conjunction with the corresponding $y$-bridge, so that the output derived from the rotor 14 will be the lift The lift
$$\frac{h}{2}$$
$$\frac{h}{2}$$

is fed from the rotor 14 to a further rotor 15 which is rotated by a shaft 30, as hereinafter described, with respect to two stators 16 and 17 so as to be at an angle $\phi+\theta$ with stator 17, the angle $\phi+\theta$ being that which a vector from the centre C of the circle to the instantaneous point on the parabola makes with the $y$-axis so that the outputs derived from the stator 16 and 17 are $$\frac{h}{2} \sin (\phi+\theta) \text{ and } \frac{h}{2} \cos (\phi+\theta)$$

respectively, namely the $x$ and $y$ components of the vector of magnitude L and direction CQ. The output of the stator 16 is applied to the primary winding 18 of an injector denoted in general by the dotted outline 19, the primary winding 18 being similar to the coil 5. In addition to the primary winding 18, the injector comprises secondary windings which are similar to coils 4 and are connected in series with the respective leads to the stud circle 3, as shown. The output from the stator 17 is similarly injected into the corresponding $y$-bridge. Thus the outputs of the $x$- and $y$-bridges are the signals necessary to cause the cutting tool holder to describe the required circular arc with reference to the workpiece holder.

The angle $\phi+\theta$ is derived in a similar manner to $\phi$, by the operation of a resolver with stators 20 and 21 and a rotor 22 on the shaft 30, the output signal of the rotor 22 being applied an amplifier 31 to a servo motor 32 which drives the shaft 30 so as to tend to maintain the output of the rotor 22 vanishingly small. The inputs to the stators 20 and 21 are signals representative of parametric derivatives of $x$ and $y$, respectively, or common multiples of these derivatives. In this case time is considered as a common parameter. Thus the rotor 22 sets at angle $\phi+\theta$ with the stator 20 since $$\frac{dy}{dx} = \tan (\phi+\theta)$$

when a circular arc is generated. The time derivatives of $x$ and $y$ may be found by any suitable means. If, for example, the interpolating device employed linear sub-interpolation means following each parabolic bridge, the signal across the sub-interpolation means is substantially representative of the required time or other parametric derivatives.

One example of a suitable linear sub-interpolation means is illustrated by FIGURE 4 and is fully described the specification of co-pending United States application Serial No. 459,814, now Patent No. 2,928,604. In FIGURE 4 the half of stud circle 3 of FIGURE 2 is illustrated in a straight line for convenience and the stud contacts are denoted by the references $a_0$ to $a_{10}$. The shaft of the stud circle 3 is represented in FIGURE 4 by the reference S and will be referred to as the slow speed shaft. This shaft S is traversed in this case with two brushes $B_1$ and $B_2$ of the make-before-break type spaced apart by a distance equal to twice the contact spacing. The brushes are displaced to represent the value of a non-geometric parameter T, which is time in this example as was indicated above.

The potential difference set up between the two brushes is applied across an auto-transformer AT, closely spaced taps on which are connected to a series of stud contacts $e_1, e_2, \ldots$ angularly disposed so as to be traversed by diametrically opposite brushes $F_1$ and $F_2$ mounted on a high speed shaft HS. The shaft HS is geared to the shaft S so that it completes one revolution for each displacement of the brushes $B_1$ and $B_2$ through twice the spacing of the contacts $a_0, a_1, \ldots$ The series of contacts $e_1, e_2, \ldots$ subtends an angle slightly exceeding 180° and the brushes $B_1$ and $B_2$ are connected to the taps on autotransformer AT connected to two of the contacts which are 180° apart. The overlap in the operation of the brushes $F_1$ and $F_2$ provided by the extension of the contacts $e_1, e_2, \ldots$ allows for uncertainty as to the timing of the change over of $B_1$ and $B_2$ from one contact to another. The brushes $F_1$ and $F_2$ are disposed so that $F_1$ or $F_2$ engages the mid-contact of the autotransformer AT when the brushes $B_1$ and $B_2$ are at the midpoint of contacts in the series $a_0$, $a_1$ . . . The potential difference set up between the brush $F_1$ and the midpoint of AT is applied to the primary winding G of a transformer the core of which is represented by the dotted rectangle H. Similarly, the potential difference set up between the brush $F_2$ and the midpoint of AT is applied to the primary winding J of a transformer the core of which is represented by the dotted rectangle K. The transformer core H carries a system of secondary winding $SH_0$, $SH_2$ . . . , each having the same number of turns, inserted in the leads to the corresponding even-numbered contacts $a_0$, $a_2$ . . . Similarly, the transformer core K carries a system of secondary windings $SK_1$, $SK_3$, . . . each having the same number of turns, inserted in the leads to the corresponding odd-numbered contacts $a_1$, $a_3$ . . . It is arranged that there is a voltage step-down of 2:1 between G and each of its secondary windings, and between J and each of its secondary windings.

Assume that the brushes $B_1$ and $B_2$ are engaging $a_2$ and $a_4$ and the brush $F_1$ is scanning the contact series $e_1$, $e_2$ . . . The displacement of $F_1$ from the mid-contact of the series represents the departure of the parameter T from the discrete value represented by $a_3$. This displacement is denoted by $\partial T$. The voltage applied across AT is the difference between $x$ at $a_4$ and $x$ at $a_2$ and the voltage applied to the transformer primary winding G represents the product of this last difference and $\partial T$. Half of this product is added to the voltage picked off from $a_2$ and $a_4$ and the actual voltage at the midpoint of AT is therefore that represented at the contact $a_3$ plus an increment obtained by linear interpolation in the interval between $a_2$ and $a_4$.

Thus, by the use of a winding ATS coupled as a secondary winding to the autotransformer AT as a primary winding a voltage substantially proportional to a parametric derivative (time derivative, say) of $x$ at $a_3$ is derived in the above case. The complementary $y$-bridge is arranged to derive at the same time a voltage similarly proportional to the parametric derivative of $y$ at the parametric value corresponding to that at $a_3$ for $x$. These derivative voltages are applied to the stators 20 and 21 of FIGURE 2 as indicated for the case of time derivatives so that the rotor 22 is driven to represent the value of the slope of the chord of the circular arc represented by the parametric values at $a_2$ and $a_4$, that is, the slope of the circular arc at a point represented by the parametric value at $a_3$.

Compensation for the radius of the cutting tool may be made by applying a voltage representative of the radius $r$ of the cutting tool to the rotor 23 which is on the same axis as rotors 15 and 22, thus deriving the appropriate corrections E$x$ and E$y$ to the $x$ and $y$ signals from the stators 24 and 25.

Also included in the above described embodiment of the invention will be switching means responsive to signals derived from the programme for switching in the injector 19. This may be done by including a switch 26 for grounding the input signal to the primary winding 18 during normal operation. Such a switch constitutes means for selectively enabling and disabling the components, which cause the output signals to represent points on a circular arc instead of a parabolic arc.

The embodiment of the present invention as described above makes use of high accuracy resolvers which, in some cases will not constitute part of the main interpolating device. It is proposed in an alternative embodiment of the present invention to modify an existing interpolating device, comprising parabolic bridges as described above, so as to be able to generate points lying on any one of a predetermined range of circular arcs when required.

Over any circular arc of given sectorial angle, the errors between the arc and the best parabolic approximation to the arc are simply proportional to the scale, that is to say the span of the arc. Thus a set of windings similar to the injector windings 19 of FIGURE 2 are included in the stud circle leads of each parabolic bridge and are excited by predetermined proportions of the lift or span voltages dependent on the sectorial angle of the required circular arc so that the errors between the programmed parabola and the arc are substantially reduced to a minimum in each case.

In a further arrangement of the present invention illustrated by FIGURE 5 a winding 27 similar to the middle one of lift windings 4 and coupled to 4 is connected between the centre of auto-transformer 2 and the centre input signal lead so that in normal operation the lift voltages are injected into the windings 4 by 27. The winding 27 is coupled to a similar winding 5 which is employed as in FIGURE 2 to derive the extra lift component $$\frac{h}{2} \sin (\phi + \theta)$$

This extra component is applied to winding 18 as before but which is now coupled to a similar winding 28 connected in series with winding 27 so that the extra lift component is injected to the normal lift windings 4 via winding 27. The winding 18 is also coupled to a similar winding 29 connected in series with winding 5 and so arranged to counteract the extra lift component which would otherwise be transferred to winding 5. In normal operation the input signal to winding 18 is grounded by switch 26 (not shown) as before.

The conditioning in all cases can be arranged for automatic operation in response to suitable control signals from a record, in well known manner.

What I claim is:

1. An interpolating device comprising two parabolic bridges, one bridge for each of two co-ordinate directions, each bridge comprising three input terminals for input signals representing the respective co-ordinate values of three spaced points, an auto-transformer connected from a first of said input terminals to a third of said input terminals, said auto-transformer being tapped at a plurality of points, conductive connections from said points to said output terminals, a second transformer having a first winding connected from the second of said input terminals to a tap on said auto-transformer and having a plurality of lift windings selectively included in said conductive connections, said second transformer having a quadratic law predetermined to produce in said lift windings voltages representing the lifts of the parabolic arc above its chord at points corresponding to said output terminals; a first selector for deriving an output signal from a selected output terminal of one bridge; a second selector for deriving a second output signal from a selected output terminal of said other bridge; means responsive to derivatives of said output signals for generating a representation of the direction of the normal to the curve defined by the signals set up at the output terminals of said bridges; means responsive to the second transformers of said bridges for deriving an additional lift signal; means for resolving said additional lift signal from said normal direction to derive two signals representing components of said lift signal in the two co-ordinate directions; means for injecting predetermined fractions of one component signal into said conductive connections of the corresponding one of said bridges; means for injecting predetermined fractions of the other component signal into said conductive connections of the other bridge, said fractions being predetermined to cause the resultant signals set up at the output terminals of said bridges to represent co-ordinate values of relatively close points on a circular arc.

2. A device according to claim 1, wherein said injecting means comprises, for each bridge, a further transformer of quadratic law having secondary windings selectively included in the respective conductive connections.

3. A device according to claim 1, wherein said injecting means comprises, for each bridge, a further transformer having a secondary winding connected in series with said first winding of the second transformer of the respective bridge.

4. A device according to claim 1 wherein each of said bridges comprises sub-interpolation means and said means for generating a representation of the direction of the normal of the required arc is responsive to said sub-interpolation means.

5. A device according to claim 1 comprising means responsive to the signals applied to the input terminals of said bridges for deriving a representation of the direction of the normal to the chord of the required arc, said means for deriving a lift signal comprising means for compounding signals derived from the second transformers of said bridges into the directions of said latter normal direction to produce the lift signal.

6. A device according to claim 1, comprising switch means for selectively enabling and disabling said means for deriving additional signals, whereby said device may be selected to generate output signals representing a parabolic arc or output signals representing a circular arc.

7. An interpolating device comprising three input terminals, a plurality of output terminals, an auto-transformer connected from a first of said input terminals to a third of said terminals, a second transformer having a first winding connected from the second of said input terminals to a tap on said auto-transformer and having a plurality of lift windings respectively connected at one end to a plurality of taps on said auto-transformer, said taps corresponding respectively to said output terminals, said second transformer having a quadratic law predetermined to produce in said lift windings voltages representing the lifts of a parabolic arc defined by said applied signals above the chord of said arc at points corresponding to said output terminals, thereby to provide at the other ends of said lift windings a plurality of signals representing values of one co-ordinate of points on said parabolic arc, means responsive to the voltage across a winding of said second transformer for providing a plurality of additional signals, and means for adding said additional signals respectively to said signals representing values of one co-ordinate of points on said parabolic arc and for applying the resultant signals as output signals respectively to said output terminals, said means for providing said additional signals being predetermined to cause the output signals to represent values of one co-ordinate of points on a circular arc derived from said parabolic arc.

References Cited in the file of this patent
UNITED STATES PATENTS

| | | |
|---|---|---|
| 2,659,849 | Cunningham | Nov. 17, 1953 |
| 2,660,700 | Gates | Nov. 24, 1953 |
| 2,781,967 | Spencer et al. | Feb. 19, 1957 |
| 2,875,390 | Tripp | Feb. 24, 1959 |
| 2,894,186 | Cail et al. | July 7, 1959 |